United States Patent Office 3,497,204
Patented Feb. 24, 1970

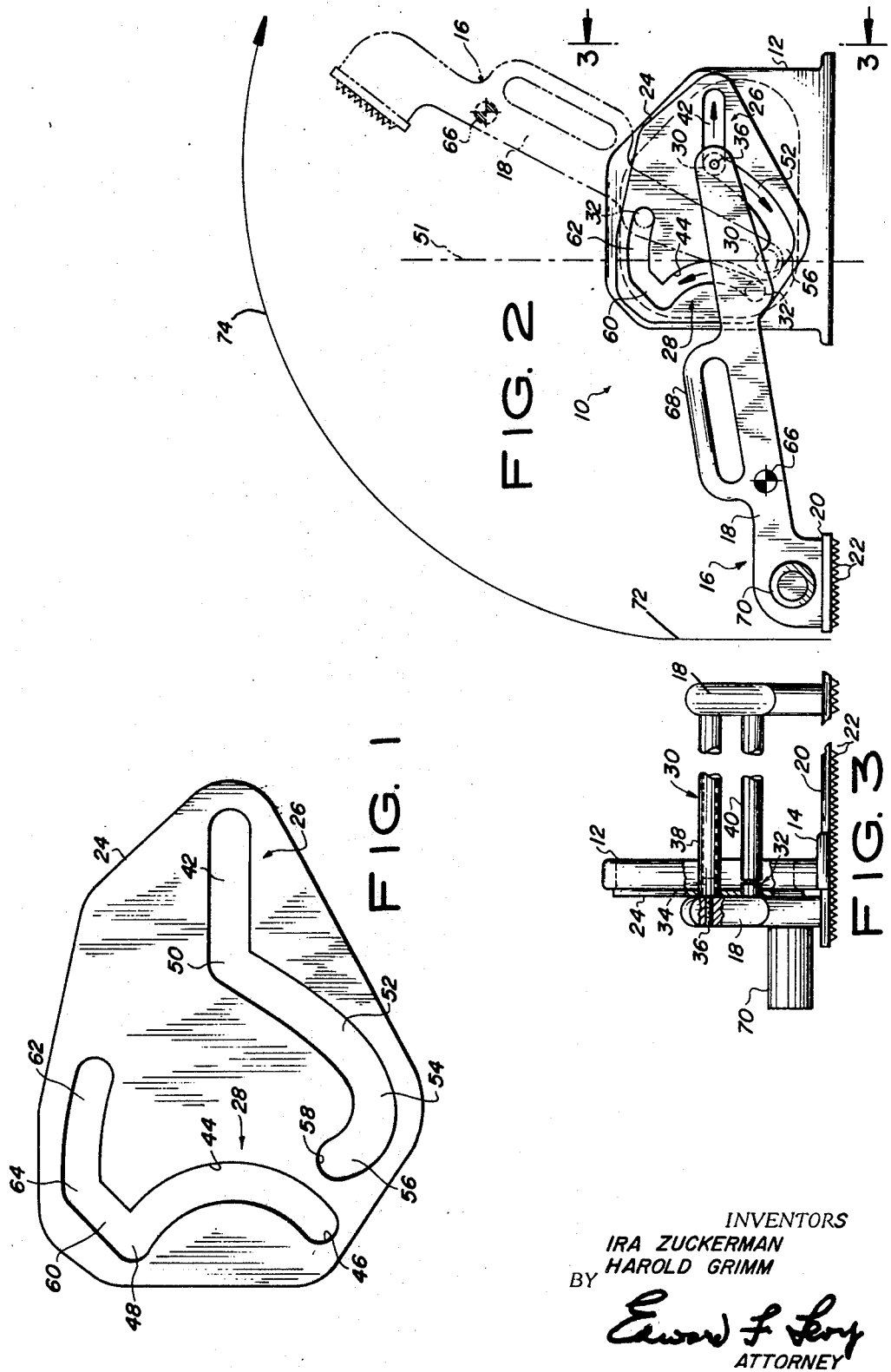

3,497,204
CLOTH CLAMPING DEVICE FOR SHEET
MATERIAL SPREADING MACHINE
Harold Grimm, Bronx, and Ira Zuckerman, Far Rockaway, N.Y., assignors to Panther Machine Corp., New York, N.Y., a corporation of New York
Filed Aug. 11, 1967, Ser. No. 659,941
Int. Cl. B25b 1/00
U.S. Cl. 269—254                         9 Claims

ABSTRACT OF THE DISCLOSURE

A device for catching and clamping layers of sheet material laid down on a surface by a spreading machine, including a clamping member movably mounted between a pair of frame plates, each of the latter having a pair of camming slots engaging the clamping member and guiding movement of the latter, the cam slots having first cooperating sections guiding the clamping member for movement with its free end traversing a vertical straight-line path, and second cooperating sections guiding the clamping member in an upward and rearward path to a rest position in which its center of gravity is located rearwardly of a vertical plane passing through the mounted end of the clamping member so that the latter is maintained in its rest position.

---

The present invention relates to machines for spreading layers of sheet material such as cloth in superimposed layers upon a table surface.

In particular, the present invention relates to cloth clamping devices mounted at the ends of the table surface and cooperating with the movable machine carriage to catch, retain and clamp down the ends of the cloth layers as the layers are spread by the carriage. These clamping devices retain the layers against longitudinal shifting movement during spreading thereof so that predetermined lengths of the layers of the sheet material will be precisely aligned one upon the other. These clamping and retaining devices engage the uppermost layer of sheet material during the spreading thereof and press it downwardly upon the stacked layers to prevent longitudinal shifting of layers while the spreading operation continues. Various mechanisms are already known for guiding movement of the clamping device in such a manner that its clamping portion which engages the cloth moves in a precise vertical path as the height of the stack of layers increases.

However, difficulties are encountered at the present time in connection with operations which take place after the spreading of layers has been completed upon reaching a predetermined height, and before the next series of layers of sheet material are spread. To enable the stack of spread layers to be removed in aligned condition from the table, or to permit the stacked layers to be cut on the table surface or otherwise processed, it is essential for the retaining device to be maintained at a position clear of the table and the stacked layers, and considerable inconvenience is involved in fulfilling this latter requirement. Either there are no particular constructions for holding the clamping device out of the way, so that considerable inconvenience is encountered, or devices which at the present time are known for holding the retaining device in a rest position clear of the table, are complex and inconvenient to manipulate and in addition undesirably increase the cost of the structure.

It is accordingly a primary object of the invention to provide a structure which will avoid the above drawbacks.

In particular, it is an object of the invention to provide a retaining device which will reliably retain the stack of layers superposed one upon the other during the spreading thereof and which at the same time can be displaced to a rest position where it is out of the way of interim operations of the type referred to above without requiring any inconvenient manipulations to be carried out and without requiring any complicated structure such as locking mechanisms and the like for releasably locking the retaining device in its rest position.

It is a primary object of the present invention to provide a construction which is capable of holding the cloth clamping member in its rest position solely by the force of gravity, so that complications such as locking devices and the like can be eliminated.

In accordance with the invention, the clamping device is used with the machine for spreading the layers of sheet material includes a stationary frame adapted for mounting on a table surface, a clamping member movably mounted at its rear end portion on the frame and having a front free end portion projecting from the frame and a transverse clamping bar carried by said free end portion for direct engagement with the uppermost layer of sheet material being stacked, the clamping bar extending parallel to the table surface and perpendicular to a predetermined vertical plane passing through said frame, and cam means on said frame having a first cam section coacting with the rear end of the clamping member for guiding the movement of the clamping member relative to said frame in a direction in which said clamping bar moves upwardly in a vertical path parallel to said vertical plane and forwardly thereof until the layers of stacked sheet material have reached a predetermined height, said clamping member having a center of gravity located proximate to the free end thereof and spaced forwardly of said vertical plane while said clamping bar is in contact with said cam means also having a second cam section coacting with the rear end portion of the clamping member for guiding said clamping member in a further upward and rearward movement to a rest position in which its center of gravity is located rearwardly of said vertical plane and said second cam section cooperates with said clamping member to hold the latter in said rest position.

Additional objects and advantages of the invention will become apparent during the course of the following specification when taken in connection with the accompanying drawings, in which:

FIG. 1 is an enlarged plan view of the cam plate forming part of the device of the invention;

FIG. 2 is a partially schematic side elevational view of the clamping device of the invention with the clamping member thereof shown in cloth clamping position in full line, and in its rest position in phantom; and FIG. 3 is a rear elevational view of a portion of the clamping device taken along line 3—3 of FIG. 2, with parts broken away and shown in section to reveal inner structural detail.

Referring now to the drawings, the cloth catching and clamping device 10 of the present invention, illustrated in FIG. 2, is adapted to be mounted on one end of a cutting table, with an identical device mounted at the other end of the table, and a cloth spreading machine travelling back and forth over the table between the two devices. The device 10 includes a pair of frame plates 12 secured parallel to and spaced from each other, as by suitable cross-bars (not shown). The plates 12 are mounted parallel to the longitudinal side edges of the cutting table. The drawings illustrate only one of the frame plates 12.

The frame plate 12, has at its bottom edge an inwardly-directed flange 14 (FIG. 3) by means of which the frame plate 12 is fixed to the table, as by suitable bolts passing through openings in the flange 14. The opposed parallel frame plate 12 which extends along the opposite edge of the table is aligned with the illustrated frame plate 12 and is fixed in the same manner to the table.

The device 10 also includes a clamping member 16 for retaining the spread layers of sheet material precisely one upon the other. This clamping member 16 comprises a pair of support arms 18, each disposed adjacent a respective frame plate 12, and connected at their front ends by a flat, elongated cloth clamping bar 20 which engages the uppermost layer of the sheet material during the spreading of the layers thereof one upon the other. As is schematically indicated in the drawings the cloth clamping bar 20 is provided at its bottom surface with downwardly directed projections 22 of rubber or other resilient material for engaging the uppermost layer with a friction which will reliably prevent shifting of the uppermost layer during spreading thereof on the layers therebeneath. Thus, by reason of the weight of the clamping member 16 and the frictional engagement thereof with the uppermost layer, all of the previously stacked layers will be precisely maintained one upon the other without any possibility of shifting thereof. The support arms 18 extend parallel to each other with their rear end portions overlapping and extending along the outer side surfaces of the respective frame plates 12. The front end portions of the support arms 18 project outwardly and forwardly of the frame plates 12, as shown in FIG. 2.

Each of the frame plates 12 has an enlarged open portion over which is secured a cam plate 24, shown in detail in FIG. 1. These cam plates 24 coact with the rear end portions of the respective support arms 18 to provide for straight-line vertical movement of the clamping bar 20, in a manner to be presently explained. After the stack of sheet material layers reaches a predetermined height, the cam plates 24 further coact with the support arms 18 to guide the latter in a rearward pivoting movement to a rest position indicated in phantom in FIG. 2.

Each cam plate 24 includes a pair of camming members comprising camming slots 26 and 28 formed therein and sized to receive cam followers 30 and 32 forming part of the clamping member 16. The cam followers 30 and 32 constitute rigid cross members extending between the support arms 18 and interconnecting the rear end portions of the latter.

As is shown in the sectional portion of FIG. 3, the cam follower 30 includes an inner cylindrical rod 34 having a threaded shank 36 of reduced diameter at each end thereof. The threaded shanks 36 are received in suitably tapped bores of the support arms 18 for rigidly interconnecting the latter. Mounted on the cylindrical rod 34 for free rotation thereon is a tubular sleeve 38. The cam follower 30 extends through the aligned camming slots 26 of the frame plates 12 with the outer surface of sleeve 38 in engagement with the cam surfaces of slots 26, the sleeve 38 thus acting as a roller as the cam follower 30 traverses said slots 26.

The cam follower 32 similarly extends through the aligned camming slots 28 of frame plates 12 and is guided thereby. The follower 32 comprises a solid cylindrical rod 40 extending between and connecting the support arms 18 in the same manner as the rod 34 of the follower 30, except that in this instance, the rod 40 is not covered by a rotatable sleeve.

The cam plate 24 is fixed to the outer side surface of the illustrated frame plate 12 in any suitable manner as by being bolted thereto, for example, and the mounted cam plate 24 covers over the enlarged opening of the frame plate 12 and serves as a surface continuation thereof. While the frame plate 12 may be a metal casting, the cam plate 24 is preferably a steel plate with the camming slots machined therein to provide for precise guiding movement of the cam followers with a minimum of wear.

As was previously indicated, the camming slot 26 receives and guides the follower 30, while the camming slot 28 receives and guides the follower 32. The camming slot 26 includes a rear horizontal slot section 42 which extends parallel to the surface of the table upon which the device 10 is mounted. The camming slot 28 has a corresponding slot section 44 in the form of an arc of a circle, the center of the arc 44 being at the elevation of the horizontal slot section 42. This arcuate slot section 44 has a convex surface directed toward the horizontal slot section 42, and has a lower end 46 and an upper end 48.

The radius of the arcuate slot section 44 is such that by coaction with the cam follower 32 and by movement of the cam follower 30 along the horizontal slot section 42 of camming slot 28, the cloth clamping bar 20 of the clamping member 16 will move precisely in an upward, vertical straight-line direction during spreading of the successive layers one upon the other. At this time the follower 32 will advance upwardly along the arcuate slot section 44 from its lower end 46 to its upper end 48. As the follower 32 rises upwardly along the slot section 44 to an elevation midway between the lower and upper ends thereof, the follower 30 advances to the right, as viewed in FIG. 2, along the horizontal slot section 42 of camming slot 26, and then as the follower 32 continues from the center of slot section 44 to the top end 48 thereof, the follower 30 moves to the left, as viewed in FIG. 2, back to the forward end 50 of the horizontal slot section 42. Thus, with the predetermined radius of the arcuate slot section 44, the clamping bar 20 of the clamping member 16 will be prevented from movement to the left or right, as viewed in FIG. 2, while the follower 32 moves toward the upper end 48 of the arcuate slot section 44.

It will be observed that during the spreading of the layers of sheet material, the cloth clamping bar 20 is situated at one side of a predetermined vertical plane 51, shown in FIG. 2, and moves in a vertical direction parallel to this vertical plane 51. Thus, in FIG. 2, the bar 20 is shown to the left of, or forwardly of, the vertical plane 51.

When the follower 32 reaches the upper end 48 of the arcuate slot section 44, the layers of sheet material will be at the predetermined height at which the spreading of successive layers is terminated, and now the structure of the invention comes into play for facilitating the displacement of the clamping member 16 to the rest position shown in phantom in FIG. 2. For this purpose, the camming slot 26 includes a downwardly-curved slot section 52 communicating with the horizontal slot section 42 as a continuation or extension thereof, this slot section 52 being in the form of an arcuate slot extending along a circle whose center is at the axis of the follower 32 when the latter is at the upper end 48 of the arcuate slot section 44. At this position, the follower 32 acts as a pivot or fulcrum for the support arms 18 for swinging movement of the latter about the axis of the follower 32 while the follower 30 moves downwardly along the curved slot section 52 of the camming slot 26.

This pivoting movement continues until the follower 30 reaches the lower end 54 of the cam section 52. Now, the follower 30 can be displaced upwardly and forwardly along a terminal curved extension section 56 of the slot section 52 which extends forwardly and upwardly from the lower end 54 of the latter. When the follower 30 reaches the extremity 58 of the extension section 52, the axis of the follower 30 will be situated in the vertical plane 51, as is apparent from FIG. 2.

The camming slot 28 further includes an upwardly and rearwardly directed slot section 60 which communicates with the upper end 48 of the arcuate slot section 44 as a continuation thereof.

This upwardly and rearwardly inclined section 60 intersects a forwardly-directed, substantially horizontal but arcuate upper slot section 62 of the camming slot 28, and the follower 32 is capable of being displaced from the arcuate section 44 along the inclined section 60, and then along the substantially horizontal upper section 62. When the follower 30 reaches the end 58 of the camming slot 26, the follower 32 is situated at the intersection 64 between the sections 60 and 62 of the camming slot 28, and now the follower 30 acts as a fulcrum or simple pivot, while the follower 32 advances along the arcuate substantially horizontal upper slot section 62 which extends along a circle whose center is in the axis of the follower 30 when the latter is at the extremity 58.

It will be noted that during these operations the center of gravity 66 of the clamping member 16 passes through the vertical plane 51 to the side thereof opposite from that side where the cloth clamping bar 20 is located during spreading of the layers, so that the clamping member 16 when in its rest position tends to turn, due to its own weight, in a clockwise direction about the axis of the follower 30 which remains at the inner extremity 58 of the camming slot 26. This turning is of course prevented by engagement of the follower 32 with the rear end of the upper slot section 62, so that in this way the clamping member will stably and reliably remain in the rest position shown in FIG. 2.

In order to facilitate raising of the clamping member 16 from its clamping position, on top of the stack of layers of sheet material, to its rest position, each support arm 18 is provided with a handle 68 which may be integral with the respective arm 18 and which may have the configuration shown in FIG. 2. These handles respectively carried by the arms 18 also facilitate return of the clamping member to the operative position shown in solid lines in FIG. 2.

It is to be understood that a structure as described above and situated at one end of the cutting table is duplicated by an identical but oppositely oriented structure situated at the other end of the table, so that a pair of the devices of the invention form a part of the spreading machine. As the reciprocating carriage moves along the table and approaches an end thereof, an arm of the carriage will in a conventional manner engage a roller 70 mounted upon and projecting laterally from at least one of the arms 18 at the free end thereof. Thus, at the region of an end of the layer the clamping bar 20 is raised away from the uppermost layer to facilitate introduction of the next layer therebeneath in a known manner. At this time the other end of the uppermost layer is of course retained by the device 10 at the opposite end of the table, so that the uppermost layer will not be capable of shifting longitudinally at this time.

It is apparent, therefore, that with the structure of the invention, without using any particular locking devices or the like, it is possible to hold the clamping member 16 reliably in its rest position where it is clear of the pile of stacked layers, to permit the layers to be removed or otherwise operated upon. Because the clamping member 16 is of a substantially U-shaped configuration, resulting from its pair of parallel support arms 18 and the clamping bar 20 extending therebetween, and because the frame plates 12 are spaced apart from each other adjacent the front and rear edges of the table at the region of one end thereof, there is a considerable clear space between the plates 12 and beneath the inner end 18 of the retaining means when the latter is in its rest position to provide a completely unobstructed space for those manipulations which take place after the stack of layers is laid down.

In FIG. 2, the arrow indicates the direction in which the free end of clamping member 16, with its attached clamping bar 20, travels during the spreading operation and in movement to its rest position. The arrow segment 72 indicates the vertical, straight line movement followed by the clamping bar 20 as the sheet material is spread, as well as the maximum height of the stack of layers. The arrow segment 74 indicates the upward and rearward path of movement of the clamping bar 20 as the clamping member 16 is raised to its rest position.

While a preferred embodiment of the invention has been shown and described herein, it is obvious that numerous omissions, changes and additions may be made in such embodiment without departing from the spirit and scope of the invention.

We claim:

1. For use with a machine for spreading layers of sheet material in superimposed layers upon a surface, a clamping device for retaining the layers of sheet material in stacked condition during spreading of said layers, said clamping device comprising a stationary frame, a clamping member movably mounted at the rear end portion thereof on said frame and having a front free end portion projecting from said frame and a transverse clamping bar carried by said free end portion for direct engagement with the uppermost layer of sheet material, said clamping bar extending parallel to said surface and perpendicular to a predetermined vertical plane passing through said frame, and cam means on said frame having first and second cam members respectively engaging said rear end portion of said clamping member at spaced points thereof, with first portions of said first and second cam members respectively comprising a first cam section and second portions of said first and second cam members respectively comprising a second cam section, said first cam section coacting with said rear end portion of said clamping member for guiding the movement of said clamping member relative to said frame in a direction in which said clamping bar moves upwardly in a vertical path parallel to said vertical plane and forwardly thereof until the layers of stacked sheet material have reached a predetermined height, said clamping member having a center of gravity located proximate to the free end thereof and spaced forwardly of said vertical plane while said clamping bar is in contact with said layers, said cam means having a second cam section coacting with the rear end portion of said clamping member for guiding said clamping member for further movement upwardly and rearwardly to a rest position in which said center of gravity is located rearwardly of said vertical plane, said clamping bar is clear of said surface and of said stacked layers, and said second cam section cooperates with said clamping member to hold the latter in said rest position.

2. A clamping device according to claim 1 in which said clamping member is held in said rest position by coaction of the rear end portion of said clamping member with an end of said first cam member and with an end of said second cam member.

3. A clamping device according to claim 1 in which said clamping member includes a pair of spaced elongated arms connected at their forward ends by said transverse clamping bar, and connected at their rear end portions by a first cam follower and a second cam follower, and said first and second cam members respectively comprise a pair of camming slots in said frame receiving the respective cam followers.

4. A clamping device according to claim 3 in which said pair of camming slots includes a front camming slot and a rear camming slot, said rear camming slot having a rear elongated horizontal slot section and said front camming slot having a lower arcuate slot section extending along a circle whose center is at the elevation of said horizontal slot section, said first cam section comprising said rear elongated horizontal slot section and said lower arcuate slot section, said first cam follower moving upwardly through said arcuate slot section and said second cam follower moving rearwardly and then forwardly through said horizontal slot section during the stacking of said layers of sheet material, and the radius of said arcuate slot section being such as to cause the free end portion of said clamping member and the clamping bar carried thereby to move upwardly in a vertical, straight-line path parallel to said vertical plane during upward movement of said first cam follower along said arcuate slot section to an upper end of the latter.

5. A clamping device according to claim 4 in which said rear camming slot further includes a downwardly-curved slot section extending forwardly and downwardly from the forward end of said horizontal slot section along an arc of a circle whose center is at the upper end of the arcuate slot section of said front camming slot, whereby when said first cam follower is at said upper end of said arcuate slot section, the first cam follower acts as a fulcrum for pivoting movement of said elongated arms, while the second cam follower moves downwardly along said downwardly-curved slot section, said latter section having an upwardly-curved terminal extension section continuing from the lower end thereof, and said front camming slot also including an upwardly and rearwardly inclined slot section communicating with the upper end of said arcuate slot section terminating in an upper elongated substantially horizontal slot section, said second cam section comprising said downwardly-curved slot section of said rear camming slot and said upwardly and rearwardly inclined slot section of said front camming slot, such that after said second cam follower reaches the lower end of said downwardly-curved slot section, the first cam follower is constrained to movement along said upwardly and rearwardly inclined slot section and along said upper horizontal slot section to the rear end of the latter, while said second cam follower moves upwardly along the terminal extension section, while the center of gravity of said clamping member is displaced rearwardly of said vertical plane to hold said clamping member in said rest position.

6. A clamping device according to claim 5 in which said arcuate slot section of said front camming slot has a convex surface directed toward said horizontal slot section of said rear camming slot.

7. A clamping device according to claim 6 in which the front end portion of said terminal upwardly-curved extension section is located in said vertical plane.

8. A clamping device according to claim 7 in which the rear end of said upper horizontal slot section of said front camming slot is situated rearwardly of said vertical plane.

9. A clamping device according to claim 8 in which said upper horizontal slot section is curved in a slightly downward direction and extends substantially along an arc of a circle whose center is situated at the front end of said terminal extension section of said rear camming slot.

References Cited
UNITED STATES PATENTS 1,942,728    1/1934    Perlstein _____ 269—254  
3,306,603    2/1967    Ziers _____ 269—91

ROBERT C. RIORDON, Primary Examiner